Dec. 5, 1933.    J. P. SPANG    1,938,197
MEAT CUBING MACHINE
Filed Nov. 22, 1930    2 Sheets-Sheet 1

Inventor:
Joseph P. Spang
by Heard, Smith & Tennant,
Attys.

Dec. 5, 1933.   J. P. SPANG   1,938,197
MEAT CUBING MACHINE
Filed Nov. 22, 1930   2 Sheets-Sheet 2

Inventor:
Joseph P. Spang
by Heard, Smith & Tennant,
Attys.

Patented Dec. 5, 1933

1,938,197

UNITED STATES PATENT OFFICE 1,938,197

MEAT-CUBING MACHINE

Joseph P. Spang, Quincy, Mass.

Application November 22, 1930
Serial No. 497,436

5 Claims. (Cl. 17—27)

This invention relates to meat-cubing machines, which is a term being used to describe a machine adapted to cut two series of parallel slits in a piece of meat with the slits of one series at an angle to those of the other series. In meat-cubing machines which are now on the market the slice of meat to be cubed is supported on a table and the slits are cut in the meat by means of a gang of knives arranged to make a pass across the slice of meat.

In these machines arrangements are provided by which the table can be turned after the knives have made one pass so that in making the next pass they will cut a series of slits which are at an angle, preferably a right angle, to the slits made during the first pass of the knives.

In my present invention I have provided a different form of machine in which the meat is supported on a stationary table and the knife carrier which supports the gang of knives is mounted on a turntable or rotary support so that after they have been given one pass across the meat to cut one series of slits therein the knife carrier can be turned bodily so that at the next pass of the knives slits will be cut in the meat at the desired angle to the first series of slits.

In order to give an understanding of the invention I have illustrated in the drawings a selected embodiment thereof which will now be described after which the novel features will be pointed out in the appended claims.

Figure 1:
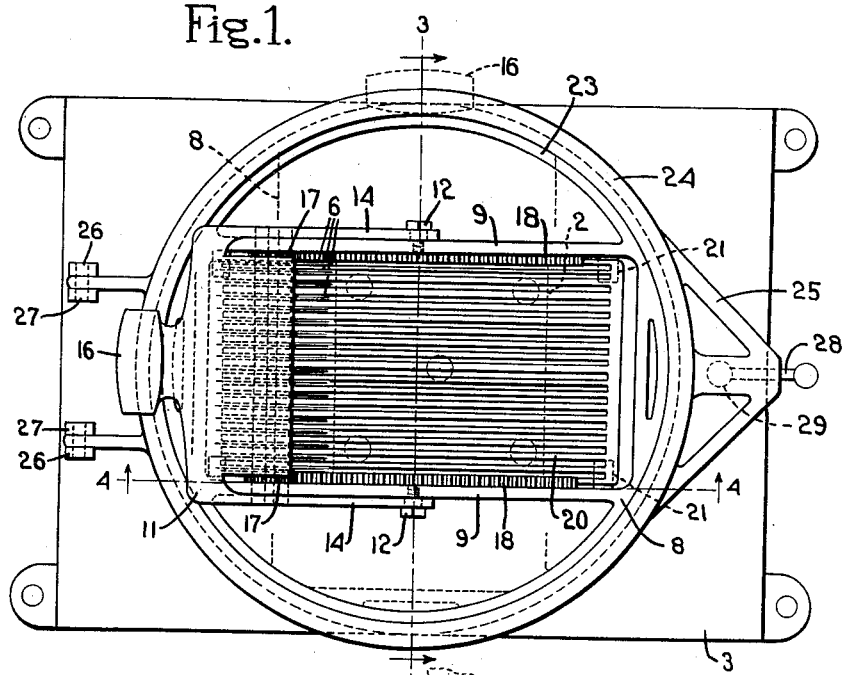
Fig. 1 is a top plan view of a meat-cubing machine embodying my invention.

In the drawings 1 indicates a slice or piece of meat which is to be cubed. This meat is supported on a stationary table or support 2 which in turn is carried by a suitable frame 3. As herein shown the table 2 rests on a plurality of levelling screws 4 that are screw threaded into the frame or base 3 and by which the table 1 can be levelled up. The table is also shown as having a depending central stem 5 which extends through an aperture in the base 3.

The slits in the meat are cut by a gang of rotary knives 6 which are shown as fast on a shaft 7. This shaft is supported in a knife-carrying frame 8 which is made with two side pieces 9 each having a guiding slot 10 to receive the end portions of the shaft 7. The gang of knives 6 are moved longitudinally of the slot 10 and across the table 2 through the medium of a swinging knife-actuating member 11 in the form of a yoke, the ends of the arms 14 of which are pivoted at 12 to extensions 13 depending from the side pieces 9. The arms 14 are provided with slots 15 in which the ends of the shaft 7 are received and the member 11 is provided with the handle 16 by which it may be manipulated.

When the member 11 is swung toward the right from the full line position (Fig. 2), the knives 6 will be moved longitudinally of the side pieces 9 and will be guided by the slots 10 and during this movement they will cut slits through the meat 1. The table will preferably be adjusted so that the knives will just clear the table so that the slits will not be cut entirely through the meat.

The knives are positively rotated while they are moving across the meat and to accomplish this the shaft 7 has fast thereon pinions 17 which mesh with racks 18 carried by the side pieces 9.

The knife-supporting frame is provided with a combined clamping and stripper plate 20 which is supported on lugs 21 carried by the frame and is acted on by springs 22 which yieldingly hold it against the lugs 21. These springs are shown as secured to the under side of the rack bars 18.

The knife-supporting frame 8 is shown as mounted for turning movement about a vertical axis. In the illustrated embodiment of the invention this knife-supporting frame is formed with a peripheral ring 23 which is rotatively mounted in a circular portion 24 of a pivotally mounted frame 25. This frame is pivoted at 26 to two posts 27 rising from the base 3 so that the frame 25 together with the knife-supporting frame 8 may be swung upwardly away from the table 1 about the pivots 26. The frame 25 is provided with a spring-pressed latch 28 adapted to engage a notch in a post 29 rising from the base 3 thereby to latch the frame in its operative position.

The meat-supporting table 2 is confined between the wings or extensions 13 to which the yoke member 11 is pivoted so that the knife-supporting frame is free to be turned in the swinging frame 25.

Figure 2:
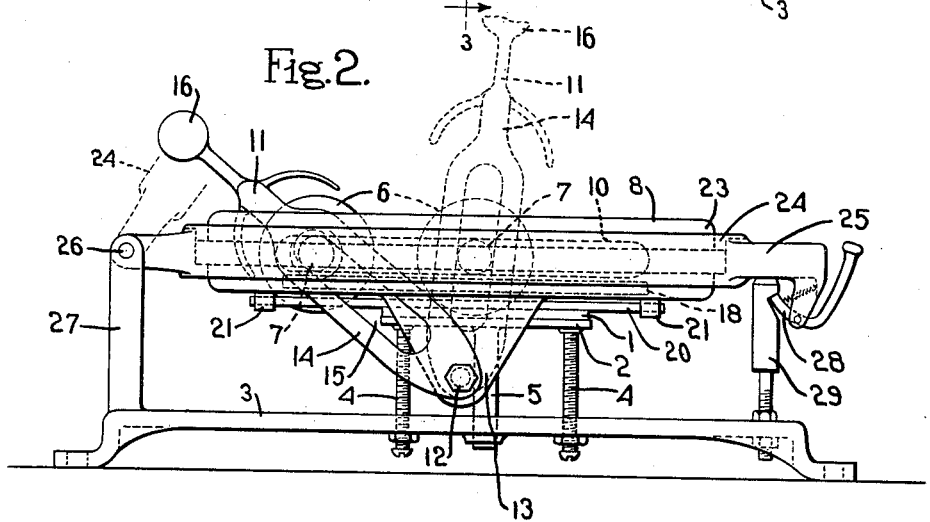
Fig. 2 is a side view thereof.
Figure 3:
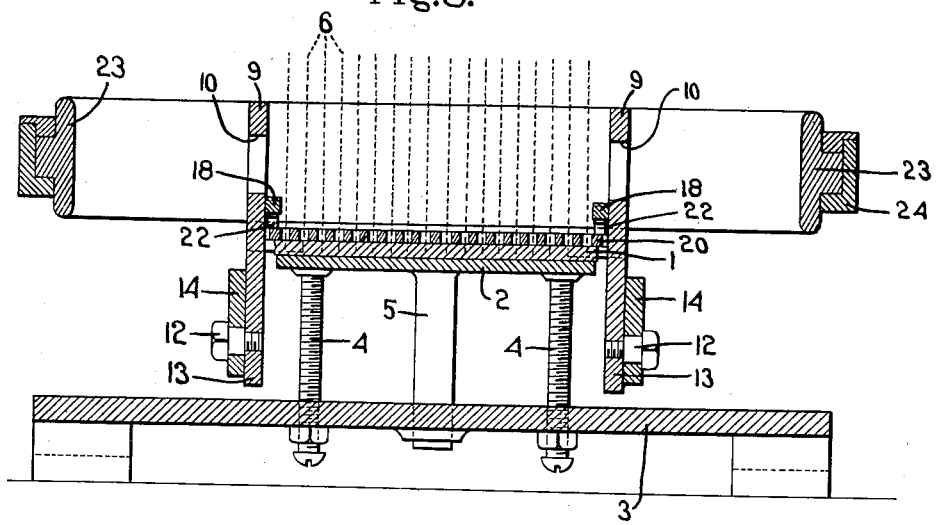
Fig. 3 is an enlarged section on the line 3—3, Fig. 1.
Figure 4:
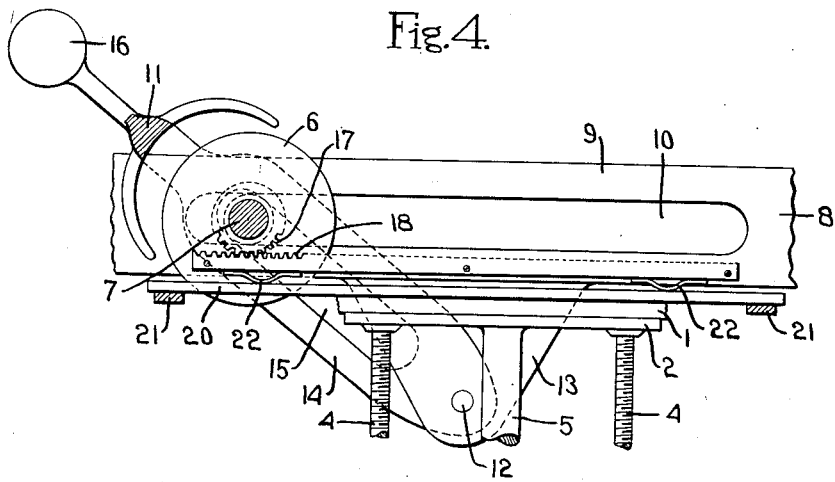
Fig. 4 is an enlarged fragmentary section on the line 4—4, Fig. 1.
Figure 5:
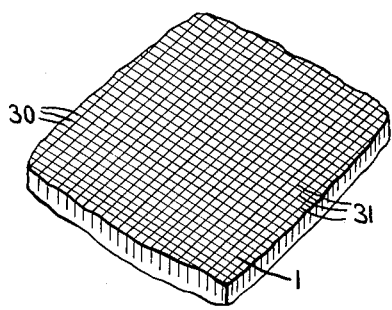
Fig. 5 is a view illustrating a piece of meat after it has been cubed on the machine.

In using the device the main frame 25 will be unlatched and swung backwardly as shown by the dotted lines in Fig. 2 and a piece of meat 1 will be placed on the table 2. The frame 25 is then brought back to its full line position and the yoke 11 is manipulated to swing it from the full line position forwardly through the dotted line position to the extent of its forward movement and during this movement the knife will be positively rotated and will cut a series of slits in the meat, such for instance as indicated at 30 in Fig. 5.

When the knives reach the forward limit of their movement they will be carried beyond the meat, and at this time the knife-carrying frame 8 may be turned in the circular portion 24 of the frame 5 into the dotted line position Fig. 1 or into any other desired position. The swinging yoke 11 may then be manipulated to cause the knives to make a second pass across the meat 1 which has remained in stationary position on the stationary table 2. During such second pass a second series of slits 31 will be cut in the meat which will be at an angle to the first slits 30. This second series of slits may be cut either at right angles to the slits 30 or at any other desired angle because it is possible to turn the knife-supporting frame to any extent between two successive movements of the yoke 11. When the meat has been thus cubed the frame 25 is unlatched and lifted into the dotted line position, thus uncovering the meat so that it can be removed from the table and replaced by an uncut slice.

I claim:

1. In a device of the class described, the combination with a main frame, of a stationary non-rotatable meat-supporting table supported on said frame, a supporting member pivotally mounted on the main frame and swingable toward and from the table, means to limit the swinging movement of said member toward the table and position said member in its operative position, a knife-carrying frame rotatively carried by the supporting member, a gang of knives mounted in the knife-carrying frame and movable therein in a direction at right angles to the axis thereof, the cutting edges of said knives being situated slightly above the top of the table when the supporting member is in its operative position, and means carried by the knife-carrying frame to move the knives relative to said frame in said direction at right angles to the axis thereof and across the top of the table.

2. In a device of the class described, the combination with a stationary meat-supporting table, of a pivotally-mounted supporting member movable toward and from the table and provided with a circular trackway, a knife-carrying frame having a circular portion mounted in said trackway, which permits said frame to be turned in the supporting member about an axis perpendicular to the plane of the trackway, a gang of knives carried by said knife-carrying frame, a rest for the supporting frame by which it is held in operative position, in which position the cutting edges of the knives are slightly above the top of the table, and means to move the knives in the knife-carrying frame to cause them to pass across the table.

3. In a device of the class described, the combination with a stationary meat-supporting table, of a pivotally-mounted supporting frame having a circular track, a knife-carrying frame having a circular portion engaging the circular track, said track permitting the knife-carrying frame to be turned in the supporting member about an axis substantially perpendicular to the plane of the track, a gang of knives movably mounted in the knife-carrying frame, the latter having two depending extensions, a knife-actuating lever pivoted to said extensions, and a connection between said lever and knives by which swinging movement of the lever causes the knives to pass across the table.

4. In a device of the class described, the combination with a main frame, of a non-rotatable meat-supporting table stationarily carried thereby, a supporting member pivoted to the main frame and swingable toward and from the table into and out of operative position, a knife-carrying frame mounted in the supporting member for turning movement about an axis at right angles to the plane of the table when said supporting member is in its operative position, a gang of knives mounted in said knife-carrying frame and movable therein in a direction at right angles to the axis thereof, and means carried by the knife-carrying frame and operable in all positions thereof relative to the supporting member to give the knives such movement.

5. In a device of the class described, the combination with a main frame, of a non-rotatable meat-supporting table stationarily carried thereby, a supporting member pivoted to the main frame and swingable toward and from the table into and out of operative position, a knife-carrying frame mounted in the supporting member for turning movement about an axis at right angles to the plane of the table when said supporting member is in its operative position, a gang of rotary knives mounted in said knife-carrying frame and movable therein in a direction at right angles to the axis thereof, means carried by the knife-carrying frame and operable in all positions thereof relative to the supporting member to give the knives such movement, and means to rotate the knives as they are moved bodily in the knife-carrying frame.

JOSEPH P. SPANG.